United States Patent
Dong et al.

(10) Patent No.: US 11,339,955 B1
(45) Date of Patent: May 24, 2022

(54) ROTARY JOINT FOR LIGHTING FIXTURE

(71) Applicant: FULTON SCIENCE AND TECHNOLOGY LIGHTING CO., LTD, Shenzhen (CN)

(72) Inventors: Pei Dong, Shenzhen (CN); Zhiqiang Xue, Shenzhen (CN)

(73) Assignee: FULTON SCIENCE AND TECHNOLOGY LIGHTING CO., LTD, Shenzhen (CN)

( * ) Notice: Subject to any disclaimer, the term of this patent is extended or adjusted under 35 U.S.C. 154(b) by 0 days.

(21) Appl. No.: 17/230,995

(22) Filed: Apr. 14, 2021

(30) Foreign Application Priority Data

Mar. 5, 2021 (CN) .......................... 202110247077.9

(51) Int. Cl.
*F21V 21/00* (2006.01)
*F21V 21/14* (2006.01)
*F16M 13/02* (2006.01)

(52) U.S. Cl.
CPC ........... *F21V 21/14* (2013.01); *F16M 13/022* (2013.01)

(58) Field of Classification Search
CPC .............................. F21V 21/14; F16M 13/022
USPC ....... 248/222.52, 222.51; 362/382, 365, 362, 362/459, 523; 403/345, 350
See application file for complete search history.

(56) References Cited

U.S. PATENT DOCUMENTS

| | | | | |
|---|---|---|---|---|
| 5,000,608 A * | 3/1991 | Schmidt | ................ | F16M 13/02 403/92 |
| 5,156,630 A * | 10/1992 | Rappoport | ............ | A61F 2/6607 623/47 |
| 7,320,666 B2 * | 1/2008 | Bjork | ..................... | A61B 90/57 600/227 |
| 8,702,340 B2 * | 4/2014 | Lin | ........................ | B65G 47/90 403/325 |
| 2014/0101953 A1 * | 4/2014 | Briggs | ................... | G01B 5/008 33/503 |
| 2015/0362305 A1 * | 12/2015 | Ferrari | ..................... | G01D 5/34 33/503 |
| 2021/0011223 A1 * | 1/2021 | Jericho | ................ | G02B 6/3604 |
| 2021/0063648 A1 * | 3/2021 | Popp | .................... | G02B 6/3604 |

* cited by examiner

*Primary Examiner* — Todd M Epps (57) ABSTRACT

A rotary joint for a lighting fixture includes: a first mounting member having a first housing; a second mounting member having a second housing and a positioning plate; a number of first metal connecting plates fixed to the first mounting member; a number of second metal connecting plates fixed to the second mounting member; and a shaft passing through the first housing, the second housing, the positioning plate, the first metal connecting plates, and the second metal connecting plates. The shaft rotatably connects the first mounting member to the second mounting member.

10 Claims, 11 Drawing Sheets

ROTARY JOINT FOR LIGHTING FIXTURE

CROSS REFERENCE TO RELATED APPLICATIONS

This application claims priority to Chinese Patent Application No. 202110247077.9, filed Mar. 5, 2021, which is hereby incorporated by reference herein as if set forth in its entirety.

BACKGROUND

1. Technical Field

The present disclosure generally relates to rotary joints, and particularly to a rotary joint for a lighting fixture.

2. Description of Related Art

Some conventional grow lights have movable hinges that enable the grow lights to be folded to reduce packaging and transportation space. Many movable hinges are made of aluminum die-casting or plastic injection. When subjected to long-term strong external force, there are hidden defects in the movable hinges such as stress, air bubbles, and fusion. The defects may cause partial small cracks in the movable hinges under long-term stress. In addition, some of the conventional grow lights do not provide a channel for cables to pass therethrough. After the grow lights are assembled, part of the cable of the grow lights is exposed, which not only affects the overall appearance, but also cannot completely form a reliable protection for the exposed cable.

Therefore, there is a need to provide a rotary joint for a lighting fixture to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 1:
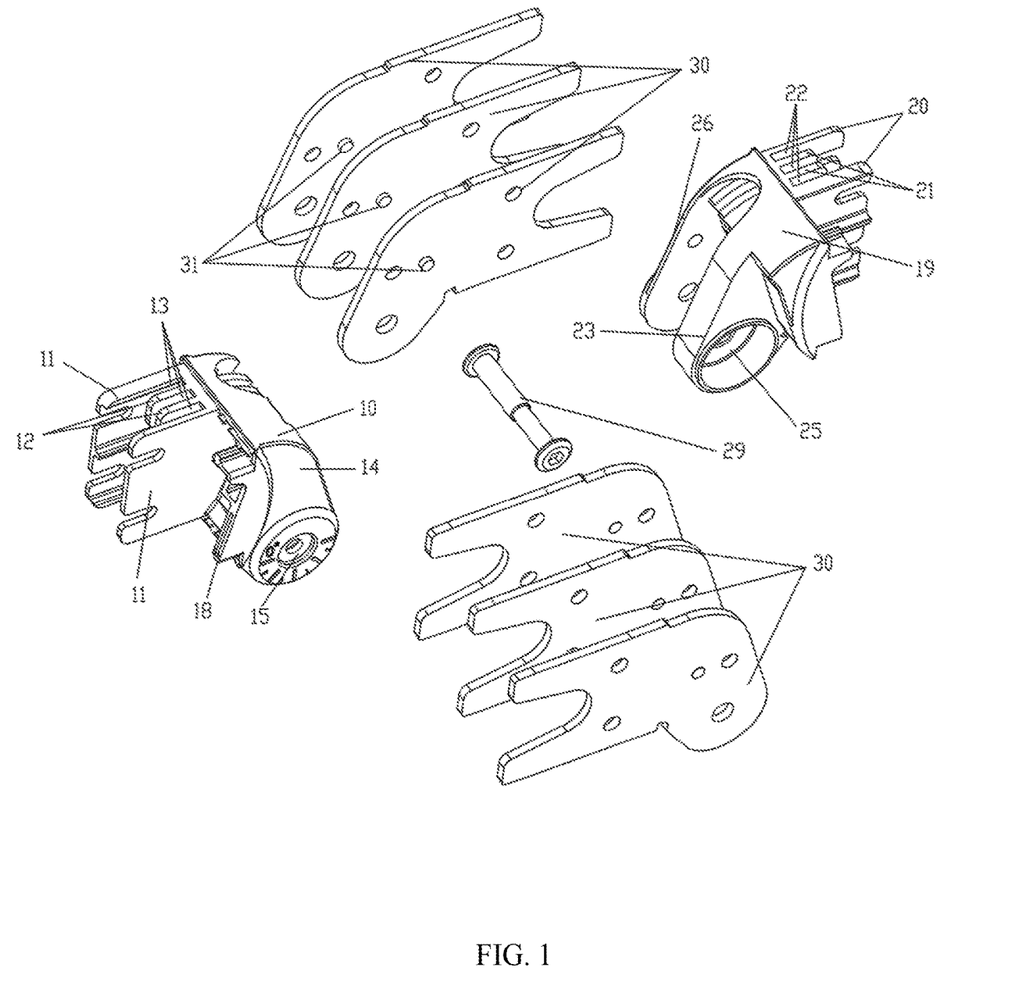
FIG. 1 is an isometric exploded view of a rotary joint for a lighting fixture according to one embodiment.
Figure 2:
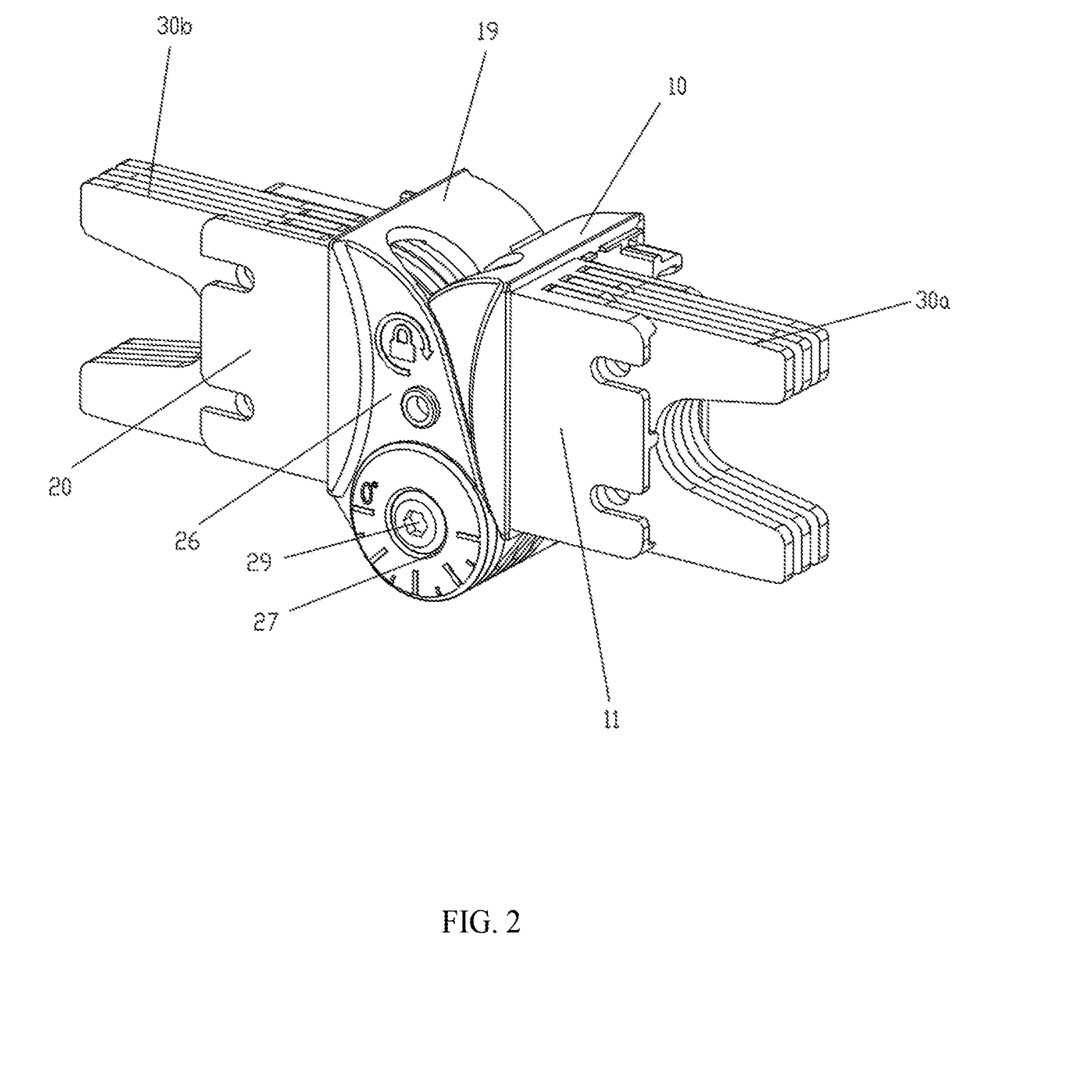
FIG. 2 is an isometric assembled view of the rotary joint of FIG. 1.
Figure 11:
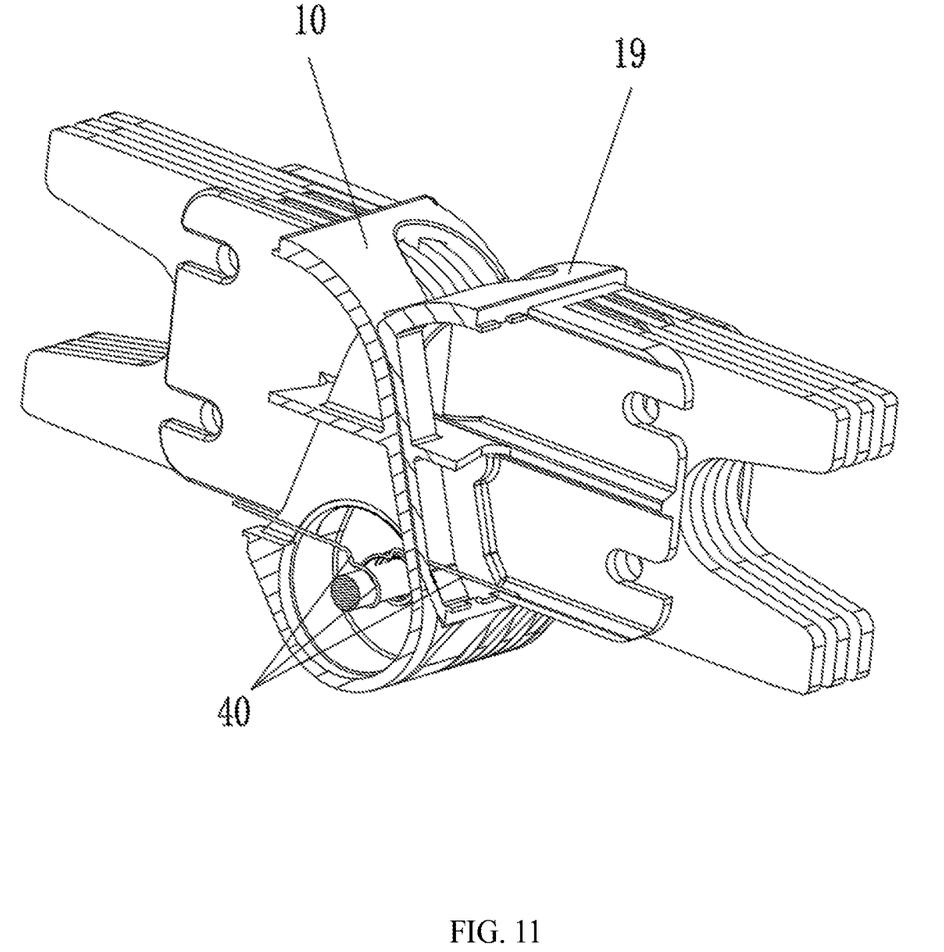
FIG. 11 is similar to FIG. 2, but viewed from a different perspective, with a portion to be cut away to show a cable.

Referring to FIGS. 1 and 2, in one embodiment, a rotary joint for a lighting fixture includes a first mounting member 10, a second mounting member 19, a shaft 29, and a number of metal connecting plates 30. The first mounting member 10 includes a first housing 14. The second mounting member 19 includes a second housing 23 and a positioning plate 26. Some of the metal connecting plates 30 (hereinafter "first metal connecting plates 30a") are fixed to the first mounting member 10, and the other metal connecting plates 30 (hereinafter "second metal connecting plates 30b") are fixed to the second mounting member 19. The shaft 29 passes through the first housing 14, the second housing 23, the positioning plate 26, the first metal connecting plates 30a, and the second metal connecting plates 30b. The shaft 29 is configured to rotatably connect the first mounting member 10 to the second mounting member 19, which allows the first mounting member 10 and the second mounting member 19 to rotate with respect to teach other about the shaft 29. The first housing 14 defines a first through hole 16 and a first receiving space 17 that communicates with the first through hole 16. The second housing 23 defines a second through hole 24 and a second receiving space 25 that communicates with the second through hole 24. The first receiving space 17 and the second receiving space 25 form a receiving chamber that communicates with the first through hole 16 and the second through hole 24, which allows a cable 40 (see FIG. 11) to pass through the first through hole 16 and the second through hole 24. That is, the cable enters the first through hole 16, passes through the first receiving space 17 and the second receiving space 25, and extend out of the second through hole 24. In one embodiment, the first mounting member 10 and the second mounting member 19 are made of plastic material. At least one of the first metal connecting plates 30a includes a limiting protrusion 31, and at least one of the second metal connecting plates 30b includes a limiting protrusion 31. The limiting protrusions 31 are configured to stop relative rotation between the first mounting member 10 and the second mounting member 19.

Figure 9:
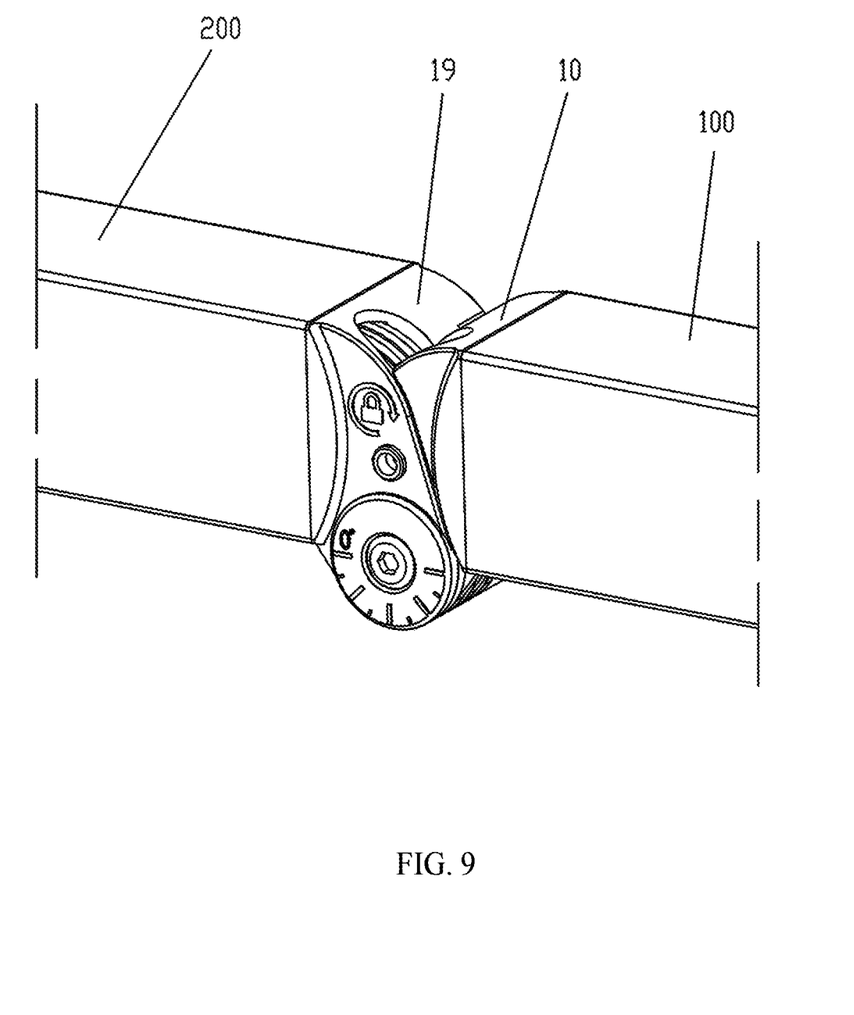
FIG. 9 is an isometric partial view of a lighting fixture with the first mounting member and the second mounting member forming an angle of 180 degrees therebetween.
Figure 10:
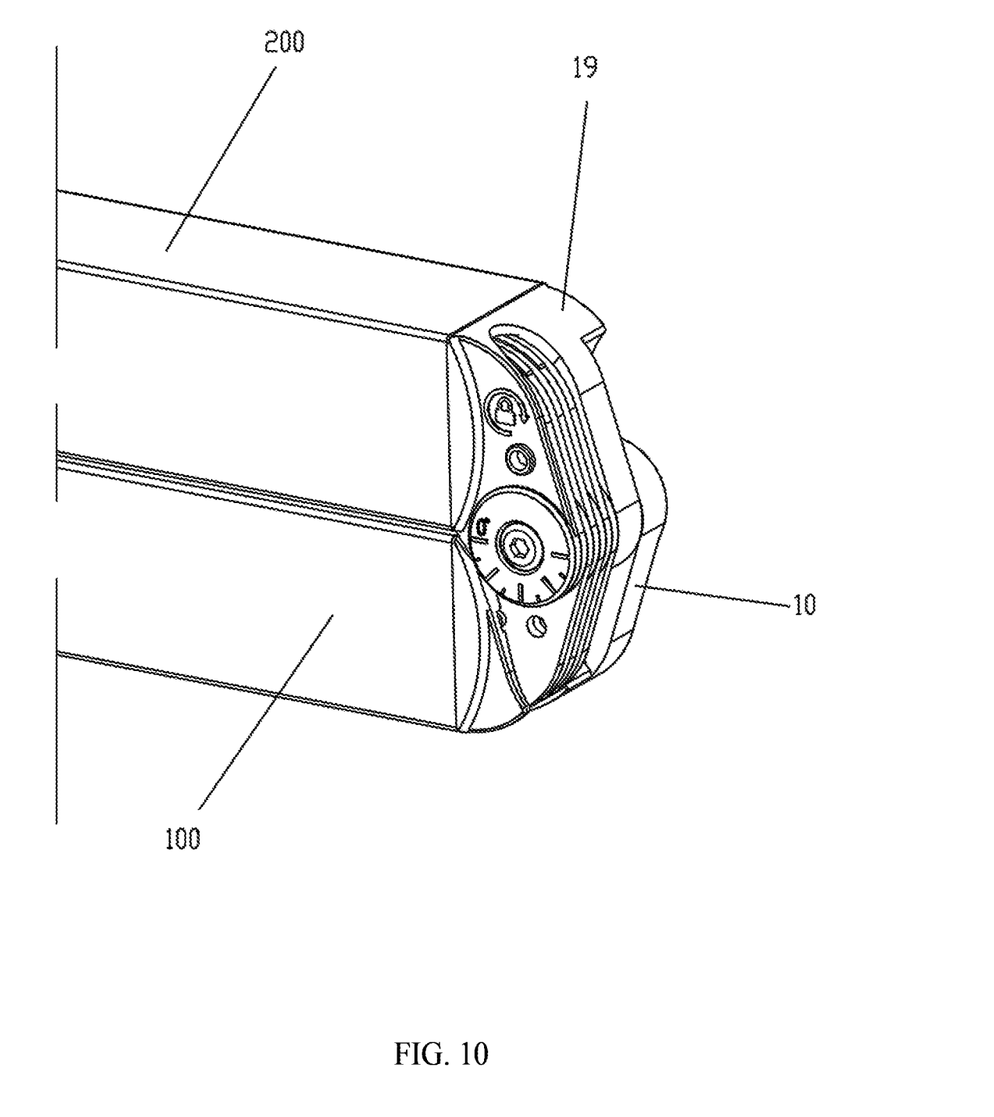
FIG. 10 is an isometric partial view of a lighting fixture with the first mounting member and the second mounting member forming an angle of zero degrees therebetween.

In one embodiment, the first metal connecting plates 30a are mounted on the first mounting member 10 in an array arrangement, and the second metal connecting plates 30b are mounted on the second mounting member 19 in an array arrangement. In one embodiment, an angle formed between the first mounting member 10 and the second mounting member 19 lies in the range of 0 to 180 degrees. FIGS. 9 and 10 show a lighting fixture having a first component 100 connected to the first mounting member 10, and a second component 200 connected to the second mounting member 19. Specifically, as shown in FIG. 9 where the angle between the first mounting member 10 and the second mounting member 19 is equal to 180 degrees, the limiting protrusions 31 on the metal connecting plates 30a abut against edges of the metal connecting plates 30b. As shown in FIG. 10 where the angle between the first mounting member 10 and the second mounting member 19 is equal to 0 degrees, the limiting protrusions 31 on the metal connecting plates 30b abut against edges of the metal connecting plates 30a. With such configuration, the angle between the first mounting member 10 and the second mounting member 19 changes in the range of 0 to 180 degrees during rotation of the first mounting member 10 with respect to the second mounting member 19.

Figure 3:
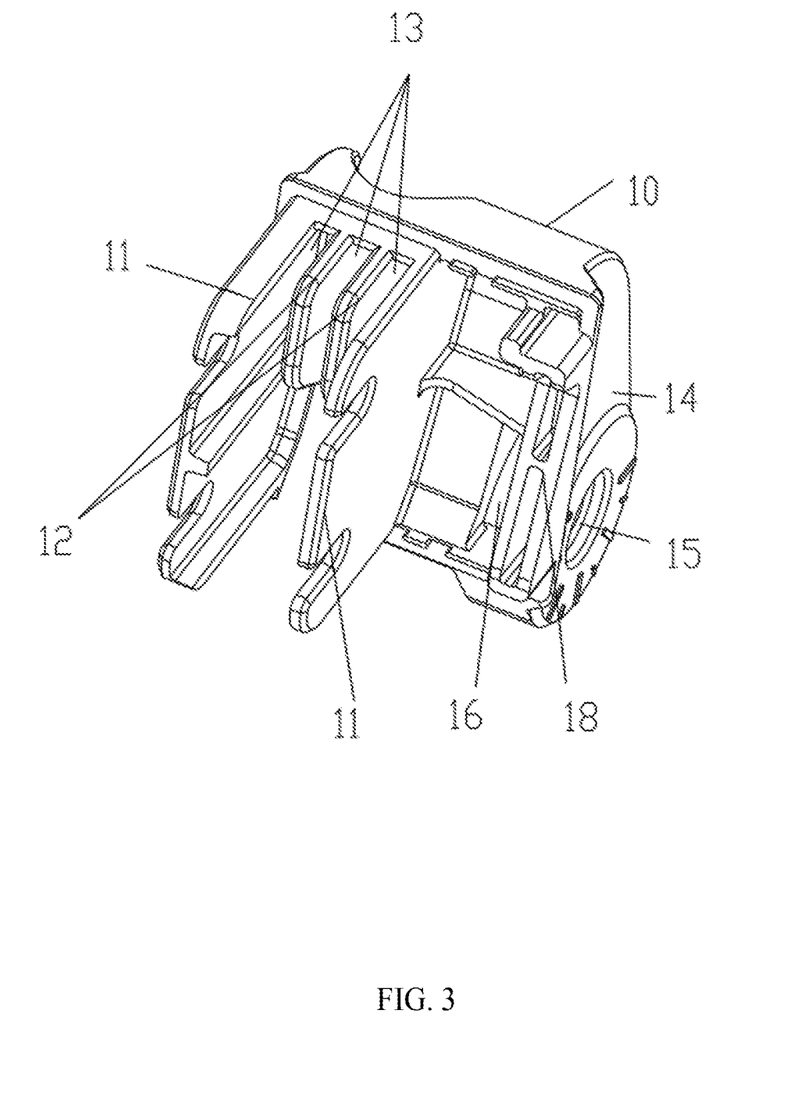
FIG. 3 is an isometric view of a first mounting member of the rotary joint.
Figure 4:
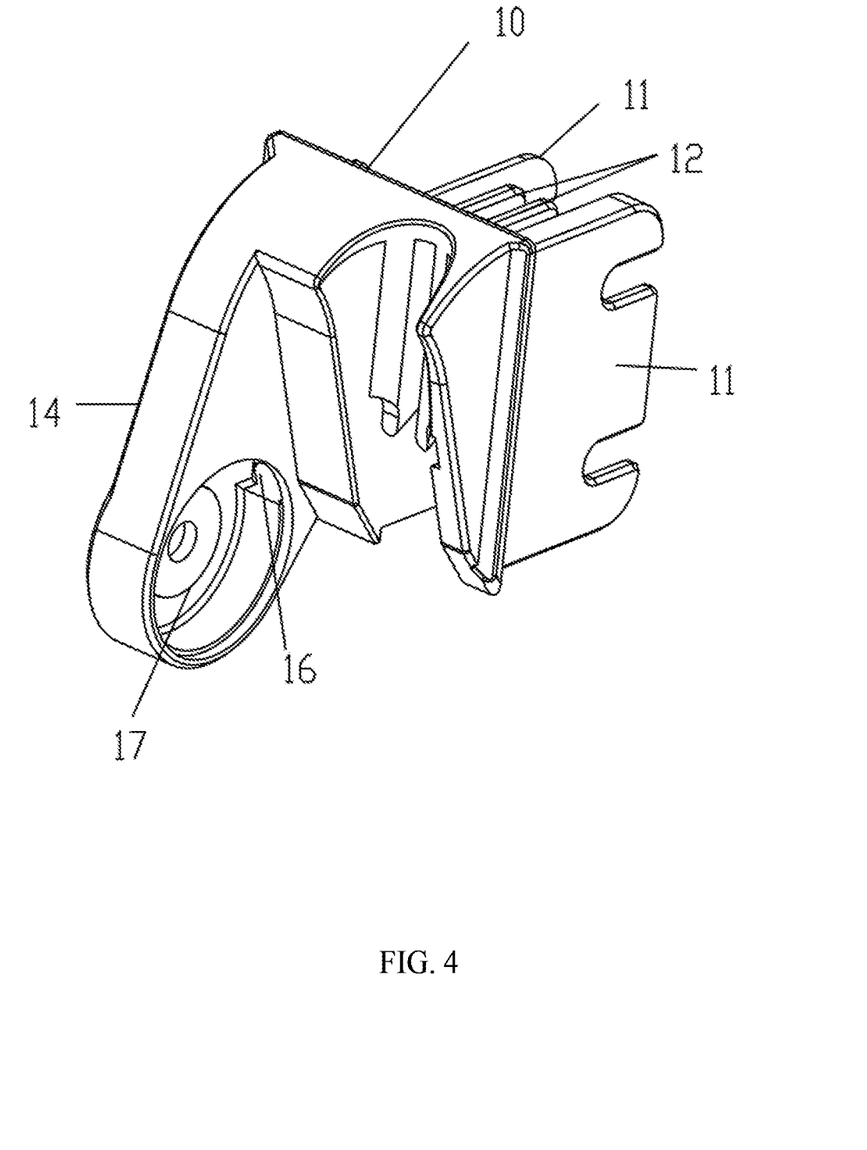
FIG. 4 is an isometric view of the first mounting member viewed from a different perspective.

Referring to FIGS. 3 and 4, in one embodiment, the first mounting member 10 includes a number of partition plates 11 and 12 that are spaced apart from one another. The partition plates 11 and 12 form a number of positioning slots 13 to respectively receive ends of the first metal connecting plates 30a, such that the first metal connecting plates 30a can be connected to the first mounting member 10.

In one embodiment, there are two partition plates 11 and two partition plates 12, and they form three positioning slots 13. Each of the positioning slots 13 receives the end of one metal connecting plate 30a.

Figure 5:
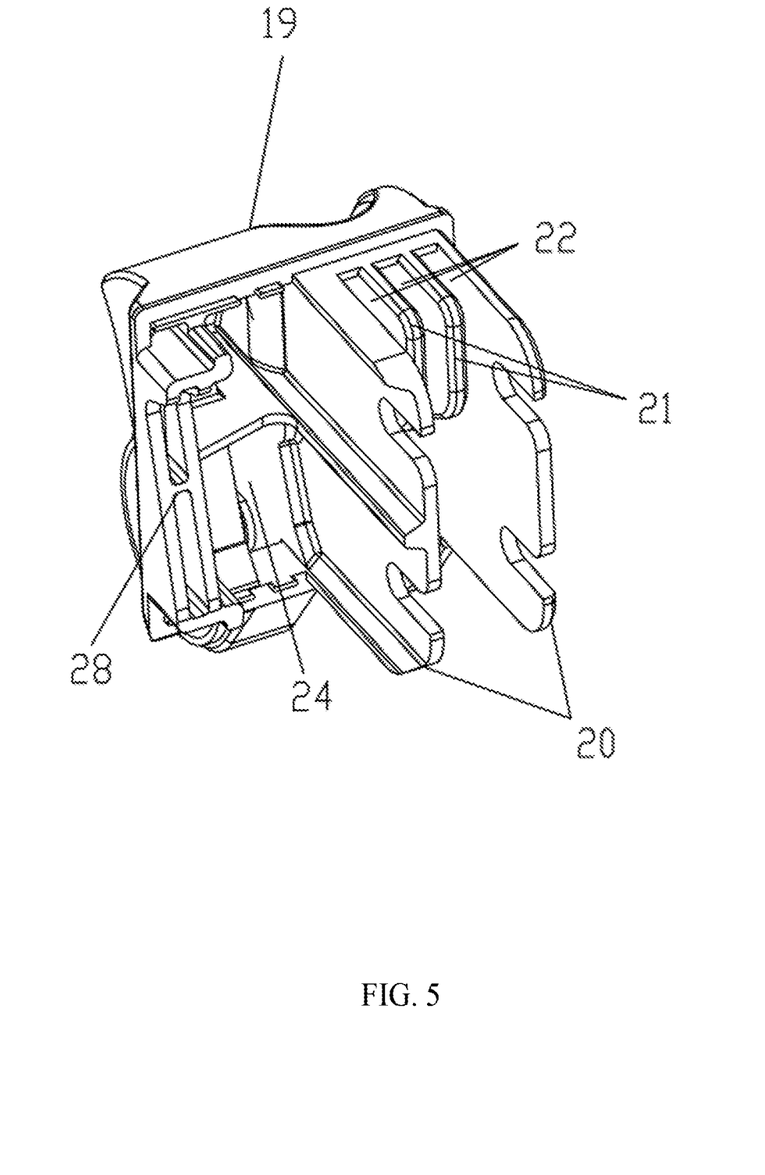
FIG. 5 is an isometric view of a second mounting member of the rotary joint.
Figure 6:
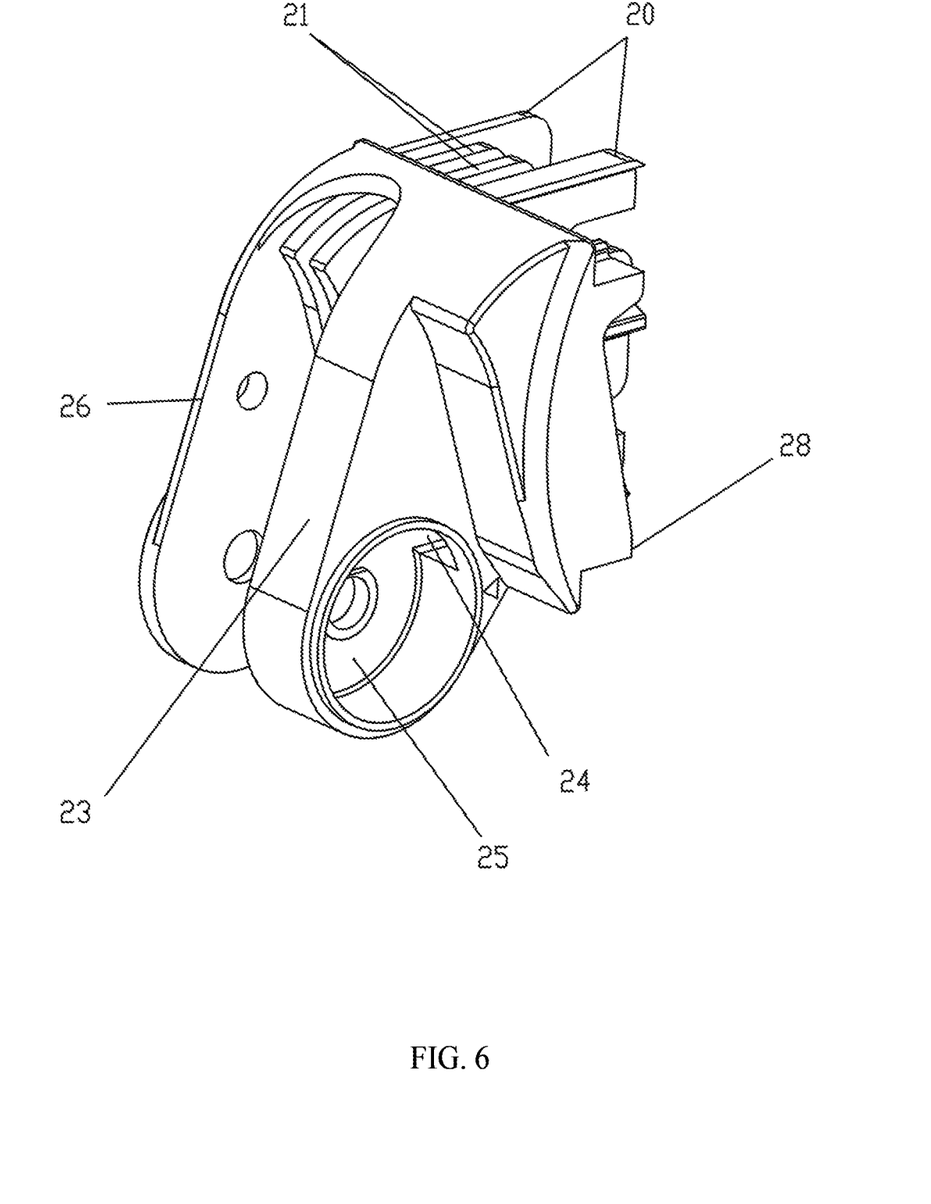
FIG. 6 is an isometric view of the second mounting member viewed from a different perspective.

Referring to FIGS. 5 and 6, in one embodiment, the second mounting member 19 includes a number of partition plates 20 and 21 that are spaced apart from one another. The partition plates 20 and 21 form a number of positioning slots 22 to respectively receive ends of the second metal connecting plates 30b such that the second metal connecting plates 30b can be connected to the second mounting member 19.

In one embodiment, there are two partition plates 20 and two partition plates 21, and they form three positioning slots 22. Each of the positioning slots 22 receives the end of one metal connecting plate 30b.

Figure 7:
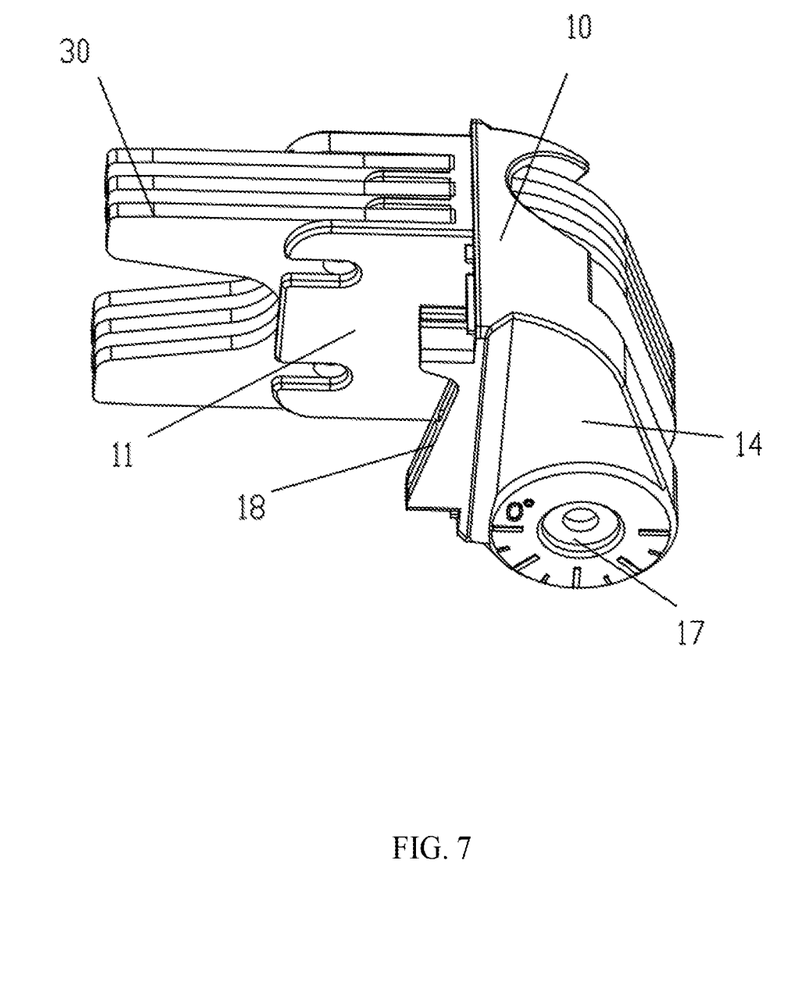
FIG. 7 is an isometric view of the first mounting member with first metal connecting plates attached thereon.
Figure 8:
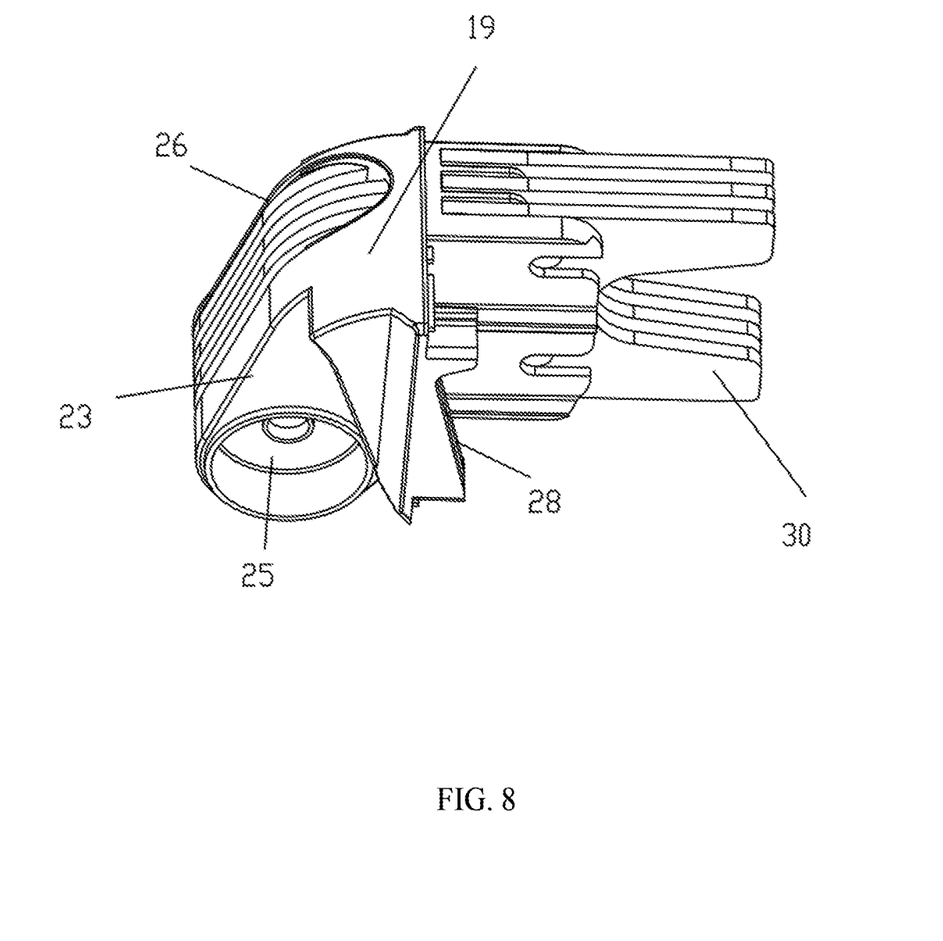
FIG. 8 is an isometric view of the second mounting member with second metal connecting plates attached thereon.

Referring to FIGS. 7 and 8, in one embodiment, the first mounting member 10 further includes a first engagement member 18, and the first through hole 16 extends between the first engagement member 18 and one partition plate 11. The first engagement member 18 is configured to connect with a component of a lighting fixture so as to connect the first mounting member 10 to the component of the lighting fixture. The second mounting member 19 may further include a second engagement member 28, and the second through hole 24 extends between the second engagement member 28 and one partition plate 20. The second engagement member 28 is configured to connect with a component of a lighting fixture so as to connect the second mounting member 19 to the component of the lighting fixture.

In the embodiment, the first engagement member 18 and the metal connecting plate 30a mounted on the first mounting member 10 are both used for connecting with components of a lighting fixture. The second engagement member 28 and the metal connecting plate 30b mounted on the second mounting member 19 are both used for connecting with components of a lighting fixture.

In one embodiment, the first housing 14 defines a first receiving hole 15 in an outer side surface thereof, and the positioning plate 26 defines a second receiving hole 27 in an outer side surface thereof. Opposite ends of the shaft 29 are respectively received in the first receiving hole 15 and the second receiving hole 27.

In the embodiment, opposite ends of the shaft 29 are held in position by the first receiving hole 15 and the second receiving hole 27 such that the shaft 29 will not disengage from the first mounting member 10 and the second mounting member 19.

In one embodiment, the outer side surfaces of the first housing 10 and the positioning plate 26 are provided with scales for rotating angles. A user can view the angle between the first mounting member 10 and the second mounting member 19 by the scales.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A rotary joint for a lighting fixture, comprising:
   a first mounting member comprising a first housing;
   a second mounting member comprising a second housing and a positioning plate;
   a plurality of first metal connecting plates fixed to the first mounting member;
   a plurality of second metal connecting plates fixed to the second mounting member;
   a shaft passing through the first housing, the second housing, the positioning plate, the first metal connecting plates, and the second metal connecting plates, the shaft configured to rotatably connect the first mounting member to the second mounting member.

2. The rotary joint of claim 1, wherein the first housing defines a first through hole and a first receiving space that communicates with the first through hole, the second housing defines a second through hole and a second receiving space that communicates with the second through hole, the first receiving space and the second receiving space form a receiving chamber that communicates with the first through hole and the second through hole, which allows a cable to pass through the first through hole and the second through hole.

3. The rotary joint of claim 2, wherein the first mounting member comprises a plurality of partition plates that are spaced apart from one another, the plurality of partition plates form a plurality of positioning slots to respectively receive ends of the first metal connecting plates.

4. The rotary joint of claim 3, wherein the first mounting member further comprises a first engagement member, the first through hole extends between the first engagement member and one of the partition plates.

5. The rotary joint of claim 2, wherein the second mounting member comprises a plurality of partition plates that are spaced apart from one another, the plurality of partition plates form a plurality of positioning slots to respectively receive ends of the second metal connecting plates.

6. The rotary joint of claim 4, wherein the second mounting member further comprises a second engagement member, the second through hole extends between the second engagement member and one of the partition plates.

7. The rotary joint of claim 1, wherein the first housing defines a first receiving hole in an outer side surface thereof, the positioning plate defines a second receiving hole in an outer side surface thereof, opposite ends of the shaft are respectively received in the first receiving hole and the second receiving hole.

8. The rotary joint of claim 7, wherein the outer side surfaces of the first housing and the positioning plate are provided with scales for rotating angles.

9. The rotary joint of claim 1, wherein one of the first metal connecting plates comprise a limiting protrusion, one of the second metal connecting plates comprise a limiting protrusion, the limiting protrusions are configured to stop relative rotation between the first mounting member and the second mounting member.

10. The rotary joint of claim 1, wherein each of the first mounting member and the second mounting member is made of plastic material.

* * * * *